United States Patent Office 3,528,614
Patented Sept. 15, 1970

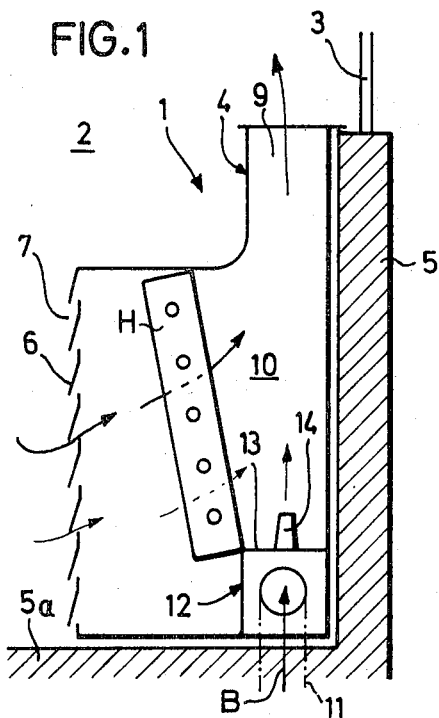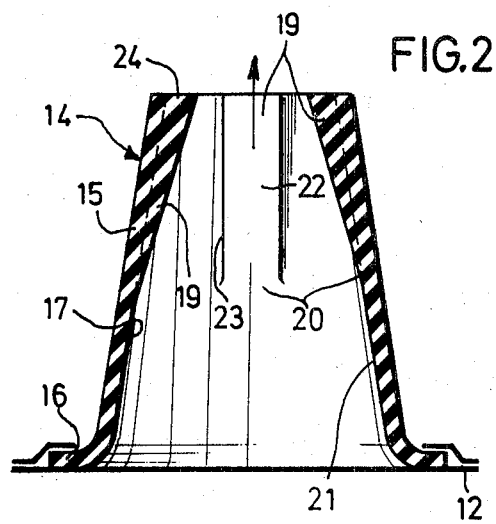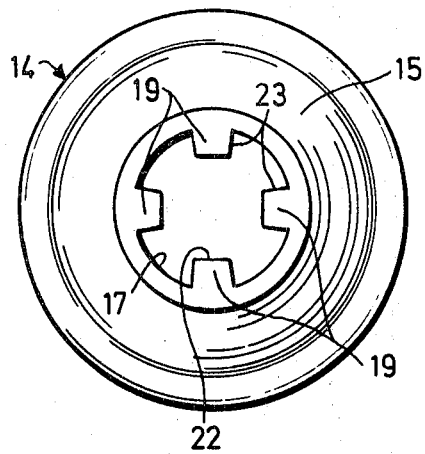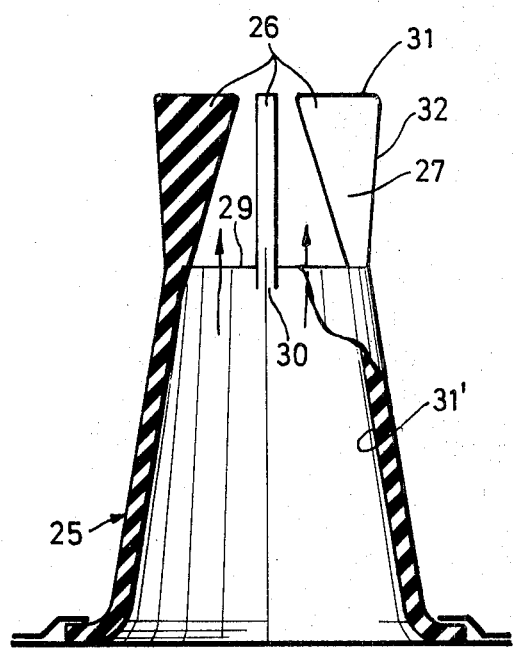

3,528,614
FLUID ADMIXING APPARATUS
Winfried Hönmann, Stuttgart-Feuerbach, Germany, assignor to LTG Lufttechnische Gesellschaft mit beschrankter Haftung, Stuttgart, Germany
Filed Apr. 30, 1968, Ser. No. 725,339
Claims priority, application Germany, May 13, 1967,
L 44,705; Mar. 21, 1968, 1,778,031
Int. Cl. B05b 1/02
U.S. Cl. 239—602
18 Claims

ABSTRACT OF THE DISCLOSURE

A fluid admixing apparatus comprises a housing which defines an interior mixing chamber. The housing has an inlet and an outlet. A nozzle communicates with the mixing chamber so that a primary stream of gaseous fluid can be introduced into and passed through the mixing chamber to thereby aspirate a secondary stream of gaseous fluid through the inlet for admixture with the primary stream and for passage of the admixed streams through the outlet. The nozzle is provided with at least one projection extending axially of the nozzle and extending radially thereacross and into the primary stream of gaseous fluid passing therethrough in such a manner as to effect a shortening of the vortex paths during admixture of the streams in the mixing chamber.

BACKGROUND OF THE INVENTION

The present invention relates to a fluid admixing apparatus in general, and more particularly of the type of fluid admixing apparatus wherein a primary fluid stream is admixed with a secondary air stream.

Aspirating or induction-type fluid admixing apparatus is known. In such apparatus a mixing chamber is provided with an inlet and with an outlet, and with a nozzle through which a primary stream of fluid is introduced into the mixing chamber at high speed and pressure. This primary stream then creates a suction effect in the mixing chamber and aspirates and induces the flow of the secondary stream of gaseous fluid into the inlet so that the two streams mix in the mixing chamber and together leave the same through the outlet. Apparatus of this type is frequently used in conjunction with air-conditioning arrangements to condition the air of enclosed spaces, such as rooms in houses, public buildings and the like. Where apparatus of this type is used for such purposes it incorporates usually a heat-exchanger for heating and/or cooling the gaseous fluid, usually air, which passes through the apparatus. The secondary air, that is the air which is induced to flow into the mixing chamber by passage of the primary stream therethrough, is aspirated from the enclosed room whose air is to be conditioned. The heat exchanger may of course be arranged in suitable manner, for instance in the path of the incoming secondary air either before or after the same becomes admixed with the gaseous fluid of the primary stream, which hereafter will also be assumed to be air.

In constructions of this type the quantity of secondary air which is aspirated is usually a multiple of the quantity of the primary air which latter is suitably treated before it is introduced into the mixing chamber, for example by having contaminants removed therefrom, by being adjusted to a predetermined level of humidity or pressure, or in similar manner. The pressure upstream of the outlet nozzle through which the primary air enters into the mixing chamber may for instance be on the order of 10–30 mm. water-column pressure and the speed at which the primary air issues from the outlet nozzle must be relatively high if proper induction of a flow of secondary air is to be obtained; such speed may for instance be on the order of 15–30 m./sec. Generally speaking a high outlet speed is desirable so as to aspirate large quantities of secondary air and to thereby increase the caloric effectiveness of the apparatus and thereby the efficiency with which conditioning of the air takes place.

However, in this connection a problem has been encountered because it is not possible to increase the issue or outlet speed at will. As the outlet speed increases, the level of noise resulting from the primary air stream increases also until a point is reached where the noise level is objectionable so that the operating efficiency of the apparatus cannot be further increased without also increasing its noise level to and beyond an objectionable level.

It is therefore an object of the invention to provide an improved construction which is not subject to the disadvantages.

SUMMARY OF THE INVENTION

In accordance with one feature of my invention I provide, in an apparatus of the type here under discussion, housing means which defines an interior mixing chamber having a first inlet, a second inlet which communicates with the ambient atmosphere, and an outlet. An arrangement is provided for introducing a primary stream of gaseous fluid under pressure and at high speed through the first inlet into the mixing chamber to thereby induce the flow of a secondary stream of gaseous fluid from the ambient atmosphere through the second inlet so that the two streams will admix in the mixing chamber and will thereupon issue from the outlet. This arrangement includes, in accordance with the invention, at least one injection nozzle which constitutes the first inlet and which is so constructed and arranged as to influence the primary stream of fluid in a manner which will effect shortening of the vortex paths which develop during admixture of the streams in the mixing chamber.

This influencing is accomplished by providing the nozzle with at least one projection or tooth extending longitudinally of the nozzle and also transversely of the free cross-section thereof so as to extend into the primary stream of fluid. It is advantageous that the maximum radial width of the tooth, that is the extent to which it projects across the free cross-section of the nozzle, coresponds at least to the thickness of the boundary layer of the primary stream which is present in the region of the outlet opening of the injection nozzle. The term boundary layer indicates that outer layer of the primary stream of gaseous fluid in which the flow speed is lower than the flow speed of the inner core of the stream as a result of the friction which develops between the boundary layer and the inner wall surface bounding the passage of the injection nozzle.

By resorting to my invention the development of noise resulting on admixture of the primary and secondary streams of air is reduced. This means, of course, that the operation of the device can be significantly improved because the quantity of secondary air which can be aspirated may be increased without increasing the noise level. In particular, it is possible by resorting to my invention to increase the outlet speed of the primary air stream from the injection nozzle, and to thereby increase the quantity of secondary air which is aspirated and consequently the caloric efficiency of the device, without a concomitant increase in the noise level. I have found that it is advantageous if the single projection or tooth, or the several such projections which may be provided, extend radially across the free cross-section of the passage through the injection nozzle. My tests have shown that the reduction in the length of the vortex paths which is accomplished by providing these projections in the nozzle or on the nozzle, is based in particular on the fact that the development of annular eddies which completely surround the primary air stream is eliminated in the zone in which the primary air stream and the secondary air stream undergo admixture. This is contrary to constructions known from the prior art where the outlet nozzles are always so configurated that such annular eddies devepol. Their presence, resulting from the rotating boundary layer which develops on the conventional cylindrical inner surface bounding the passage through such injection nozzles, is the cause for the vortex paths which develop at the periphery of the primary air stream, to be relatively long and this in turn results in a rise in the noise level. This can be counteracted by reducing the speed at which the primary air stream issues from the outlet nizzle, but only at the expense of also reducing the efficiency with which the primary air stream induces the inflow of a secondary stream of air. Evidently, this reduces the entire efficiency of the device.

It will be appreciated that the projections provided in accordance with the present invention may be arranged in various different ways as long as their presence and arrangement assures that the aforementioned annular eddies are elimnated and that thereby a reduction in the length of the vortex paths is assured. Of course, the construction and arrangement of the projections must be such that they will offer low aerodynamic resistance to the flow of the primary air stream because otherwise they would themselves contribute to an increased noise level. This is advantageously accomplished by having the upstream ends of the projections, that is the ends facing the inlet of the injection nozzle, enter smoothly and "shockless" into the cross-section of the primary air stream. In other words, at their upstream ends the projections must not have any portions so configurated that they would quickly and drastically alter the cross-sectional configuration of the primary air stream passing through the injection nozzle. I have found it to be particularly advantageous if the axial length of such projections, that is the length measured from their upstream end to their downstream location where they penetrate to a maximum extent transversely of the free cross-section of the injection nozzle passage, is significantly greater than the breadth of the projections as seen in circumferential direction of the passage and is also greater, and advantageously significantly greater, than the maximum width or depth of penetration. In particular I have found it to be highly advantageous if the width or penetration of each projection continuously increases from the upstream end thereof to the point of maximum width.

I have also found that it is important for the axial length of the projections to be carefully calculated. Preferably, the axial length should be at least equal to 0.8 the dimension of the diameter of the circle whose cross-sectional area corresponds to the area of the outlet of the injection nozzle. In many cases it will be advantageous if the axial length is at least equal to 2.5 times the aforementioned diameter.

The novel features which are considered as characteristic for the invention are set forth in particular in the appended claims. The invention itself, however, both as to its construction and its method of operation, together with additional objects and advantages thereof, will be best understood from the following description of specific embodiments when read in conenction with the accompanying drawings.

BRIEF DESCRIPTION OF THE DRAWING

FIG. 1 is a somewhat schematic sectional elevational view illustrating an apparatus according to the present invention installed in an operative position;

FIG. 2 is a longitudinal section on an enlarged scale of an injection nozzle according to the present invention;

FIG. 3 is a top-plan view of the nozzle shown in FIG. 2; and

FIG. 4 is a partially sectioned view similar to FIG. 2 but illustrating a further embodiment of a nozzle constructed according to the present invention.

DESCRIPTION OF THE PREFERRED EMBODIMENTS

Discussing now the drawing in detail it should first be noted that corresponding parts in all figures are identified with corresponding reference numerals. Keeping this in mind, and discussing firstly FIG. 1, it will be seen that reference numeral 1 identifies a schematically illustrated admixing apparatus embodying the present invention. The apparatus 1 is installed in a room 2 whose air is to be conditioned, and more particularly the apparatus 1 is installed in a recess defined between the side wall 5 and the floor 5a of the room below a window 3 thereof. The housing of the apparatus 1 is identified with reference numeral 4 and is provided with a plurality of shutters 6 or the like which are so arranged that openings 7 exist between them through which a primary air stream may enter into the interior of the housing 4 in the direction indicated by the arrows. The housing 4 further has an outlet 9 which is directed vertically upwards and through which conditioned air is reintroduced into the room 2.

In the embodiment illustrated in FIG. 1 a heat exchanger H, which may be of any suitable construction and may serve for heating and/or cooling of the air, is arranged in the housing 4 in such a manner that the incoming secondary air will pass through and over the heat exchanger H before it enters the mixing chamber 10 wherein it becomes admixed with the primary air. This primary air is suitably treated in known manner which is neither illustrated nor described in more detail as being immaterial to the purposes of the present invention, and is then introduced in the direction of the arrow B through a conduit 11 which is illustrated in phantom lines, into a pressure conduit 12. From the pressure conduit 12 the primary air issues through one or more injection nozzles 14 into the mixing chamber 10. In view of the overpressure existing in the pressure conduit 12 the primary air will issue from the injection nozzles 14 at high speed and will in no manner effect aspiration or induction of a flow of secondary air through the openings 7 from the room 2 into the housing 4, through and across the heat exchanger H, and into the mixing chamber 10 where the secondary air becomes admixed with the primary air. The thus-mixed air leaves the housing 4 through the outlet 9 and is introduced back into the room 2 so that the air in the room is constantly being turned over and conditioned.

The invention disclosed herein resides in the construction of the injection nozzle or nozzles 14 of which one is shown in FIG. 2 by way of example and in longitudinal section, whereas the nozzle is shown in FIG. 3 in top-plan view of FIG. 2. As shown in FIGS. 2 and 3, the injection nozzle 14 may consist of rubber or a synthetic plastic material, although this is not absolutely necessary. However, the use of such rubber makes it possible to construct the nozzle 14 in a simple manner, for instance by producing it in one piece via injection molding. In any case, the nozzle 14 is provided with an annular peripheral wall 15 having a base 16 in form of a ring flange. The manner in which the nozzle 14 is connected via this ring flange 16 to the wall of the pressure conduit 12 is illustrated schematically in FIG. 2 and need not be further described.

In accordance with the present invention the inner circumferential wall surface 17 bounding the passage through the injection nozzle 14 is of substantially frustoconical outline and is provided, in this embodiment and as clearly shown also in FIG. 3, with four identical substantially triangularly cross-sectioned teeth or projections 19 which extend radially inwardly partly across the free cross-section of the passage bounded by the wall 15. These projections 19 extend axially of the passage from the outlet opening of the nozzle 14 to a location which in the illustrated embodiment is substantially midway between the outlet opening and the inlet opening of the nozzle. In the embodiment of FIGS. 2 and 3 the projections 19 are equi-angularly spaced circumferentially of the surface 17 as clearly shown in FIG. 3. However, it is neither necessary that there be four of such projections nor that they be equi-angularly spaced. The upstream ends 20 of the projections 19 rise smoothly from the inner circumferential wall 17, as shown in FIG. 2, and in the illustrated embodiment of FIGS. 2 and 3 the width of the projections 19, that is the extent to which they project transversely of the passage within the nozzle 14, increases continuously from the respective upstream ends 20 to the respective downstream ends 24 which are located at the outlet of the nozzle passage. Thus, the maximum width of each of the projections 19 is to be found at the outlet of the nozzle passage. Each of the projections 19 is of substantially constant width and has a radially inwardly directed face 22 as well as flanks 23, all of which are smooth.

While in FIGS. 2 and 3 the increase in the width of the projections 19 is continuous and linear, it will be appreciated that this is not absolutely necessary, but that this configuration is particularly advantageous from an aerodynamic point of view. The axial length of each of the projections 19 with respect to their maximum width is such that the cross-section of the stream of primary air passing through the nozzle passage will be changed only gradually as the air advances from the inlet to the outlet of the passage. The projections 19 penetrate from outside radially into the stream of primary air and because of their construction they provide a reduction in the length of the vortex path by preventing the development of annular eddies which would otherwise surround the free primary air stream, that is the primary air stream downstream of the outlet of the nozzle passage.

With this construction the speed at which the primary air stream can issue from the outlet of the nozzle 14 can be significantly increased as compared to nozzles not provided with the projections 19 without an increase in the noise level, and thus the quantity of secondary air which is aspirated by the primary air is also increased and the entire device becomes more efficient. Also, with a given size of the cross-sectional area of the nozzle passage outlet opening the circumferential area of the issuing primary air stream is increased with the nozzle according to the present invention and this in turn also advantageously influences the induction or aspirating effect.

It is to be understood that the nozzle 14 may be of configuration other than what has been shown in FIGS. 2 and 3 as long as the projections 19 are provided in accordance with the present invention. It will also be appreciated that the size of the nozzle or nozzles be selected at will, and that the proper operation of the invention is not influenced by the size selection. The wall surfaces bounding the fluid passage in the nozzle intermediate the projections 19 may be of any desired and/or well known configuration, for instance portions of a surface of rotation taper in the direction towards the outlet of the nozzle 14.

While the cross section of the projections 19 is somewhat triangular, it may also be described as substantially rectangular or quadratic, FIG. 3 showing that it is close enough to any of these configurations to warrant the use of the various terms.

The embodiment illustrated in FIG. 4 differs from that of FIGS. 2 and 3 in that the nozzle 25 has an inner circumferential wall surface 31' from which four equi-angularly spaced projections 26 of identical configuration rise with their upstream ends in the same smooth "shock-free" manner as in FIGS. 2 and 3, but project forwardly beyond the outlet of the nozzle passage. As seen in FIG. 4, the major portion 27 of each of the projections 26 project downstream of the outlet opening 29 of the nozzle 25 and the projections 26 are so configured that they extend transversely of and penetrate into the stream of primary air which will issue from the outlet 29 of the nozzle 25. The outer marginal portion 32 of the projections 26 also taper radially outwardly, that is in opposition to the inner marginal portions which extend into the primary air stream. The purpose of so configurating the outer marginal portions 32 is to assure that they will penetrate outwardly into the zone in which admixing takes place between the primary air stream and the induced secondary air stream. In inward direction the projections penetrate to the core of the primary air stream, that is through the outer boundary layer surrounding this core and the construction of these projections, particularly their low aerodynamic resistance and their effective width which increases continuously from their upstream ends 30 to their downstream ends 31, is such as to effectively prevent the development of annular eddies without, however, significantly changing the free cross-section of the outlet 29 of the nozzle 25.

It will be appreciated that in other constructions the projections 26 may be located entirely downstream of the outlet 29, that is their entire length may be located outside the nozzle 25. In fact, the projections may not be connected directly with the nozzle 25, but may be so positioned and secured, for instance by suitable supports, that their upstream ends are located downstream of, but closely adjacent to the outlet 29.

It is evidently also possible to combine the embodiments of FIGS. 2 and 4 so that for instance one of the projections is located within the nozzle passage as shown in FIG. 2, whereas one other is configurated and located as shown in FIG. 4. Again, the numbers mentioned are not binding and it is clear that more than one projection of each category may be provided. In both of the illustrated embodiments the generatrix of the inner wall surface bounding the respective nozzle passage is a straight line. However, it is clear that this is not mandatory and that the generatrix may be an expanential function without deviating from the concept and the results of the present invention.

It will be understood that each of the elements described above, or two or more together, may also find a useful application in other types of constructions differing from the types described above.

While the invention has been illustrated and described as embodied in a fluid admixing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of th generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an apparatus of the character described comprising, in combination, housing means defining an interior mixing chamber having first inlet means, second inlet means communicating with the ambient atmosphere, and outlet means and an arrangement for introducing into said mixing chamber a primary stream of gaseous fluid under pressure and at high speed through said first inlet means and a secondary stream of gaseous fluid from the ambient atmosphere through said second inlet means so that streams will admix in said mixing chamber and thereupon issue from said outlet means, at least one injection nozzle constituting said first inlet means and comprising an annular peripheral wall having an inner circumferential surface which bounds an elongated fluid passage provided with an intake end and a discharge end axially spaced therefrom, the improvement consisting of a plurality of projections elongated in axial direction of said passage and extending transversely of the latter and consequently of said primary stream of gaseous fluid so as to influence said primary stream in a manner effecting shortening of the vortex paths which develop during admixture of said streams in said mixing chamber.

2. In an apparatus as defined in claim 1, said injection nozzle means being operative for producing the primary stream consisting of a core of gaseous fluid and a boundary layer which surrounds said core and which has a predetermined thickness in the region of said discharge end, and wherein said projections have a maximum width transversely of said passage which is at least equal to said predetermined thickness of said boundary layer so that said projections penetrate the boundary layer and into the core of the primary stream.

3. In an apparatus as defined in claim 1 said inner circumferential surface converging substantially frustoconically in direction from said intake end towards said discharge end.

4. In an apparatus as defined in claim 1, said projections extending from the region of said discharge end towards said intake end.

5. In an apparatus as defined in claim 1, said projections extending from a location intermediate said ends outwardly beyond said discharge end of said nozzle.

6. In an apparatus as defined in claim 1, all of said projections being equiangularly spaced from one another.

7. In an apparatus as defined in claim 1, said projections each having an upstream end facing towards said intake end of said passage, and a downstream end, and said upstream ends being flush with said inner circumferential surface.

8. In an apparatus as defined in claim 7, the width of each projection in direction transversely of said passage increasing from said upstream end towards said downstream end.

9. In an apparatus as defined in claim 8, said width increasing continuously from said upstream end towards said downstream end.

10. In an apparatus as defined in claim 8, said width increasing linearly.

11. In an apparatus as defined in claim 1, the elongation of said projections being at least equal to 0.8 of the diameter of a circle whose cross-sectional area corresponds to the cross-sectional area of said passage at said discharge end thereof.

12. In an apparatus as defined in claim 1, the elongation of said projections being at least equal to 2.5 times the diameter of a circle whose cross-sectional area corresponds to the cross-sectional area of said passage at said discharge end thereof.

13. In an apparatus as defined in claim 1, said projections each having an upstream end and a downstream end, and being of substantially constant breadth intermediate said ends as measured in circumferential direction of said passage.

14. In an apparatus as defined in claim 1, said projections extending transversely of said passage to a predetermined maximum width, said maximum width being provided in the region adjacent said discharge end.

15. In an apparatus as defined in claim 14, said maximum width being provided inwardly adjacent said discharge end.

16. In an apparatus as defined in claim 14, said projections having a predetermined breadth as measured in circumferential direction of said passage, the elongation of each projection in axial direction of said passage being larger than said maximum width and said breadth.

17. In an apparatus as defined in claim 16, said breadth being smaller than said maximum width.

18. An apparatus as defined in claim 1, said plurality comprising at least four of said projections similar to and angularly spaced from one another.

References Cited

UNITED STATES PATENTS

| | | | |
|---|---|---|---|
| 2,347,149 | 4/1944 | Chirgwin | 239—602 X |
| 2,775,482 | 12/1956 | Schütz | 239—601 X |
| 2,962,952 | 12/1960 | McGrath | 239—601 X |
| 2,976,794 | 3/1961 | Allander et al. | |
| 3,062,456 | 11/1962 | Thompson et al. | 239—522 X |
| 3,080,123 | 3/1963 | Erns | 239—601 |

M. HENSON, WOOD, JR., Primary Examiner

J. J. LOVE, Assistant Examiner

U.S. Cl. X.R.

239—419.5, 590.5; 98—38